(12) United States Patent
Hashizume et al.

(10) Patent No.: US 6,342,971 B1
(45) Date of Patent: Jan. 29, 2002

(54) PROJECTOR USING A LIGHT-SELECTIVE PRISM

(75) Inventors: Toshiaki Hashizume, Okaya; Masami Murata, Shiojiri, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/624,995

(22) Filed: Jul. 25, 2000

Related U.S. Application Data

(62) Division of application No. 09/285,003, filed on Apr. 1, 1999.

(30) Foreign Application Priority Data

Apr. 8, 1998 (JP) .......................................... 10-114203
Jan. 6, 1999 (JP) .............................................. 11-1285

(51) Int. Cl.$^7$ .......................... G02B 27/10; G02B 5/04; G03B 21/00
(52) U.S. Cl. ...................... 359/634; 359/637; 359/638; 359/833; 359/834; 353/31; 353/33; 353/81; 349/5; 349/8
(58) Field of Search ................................ 359/259, 631, 359/634, 637, 638, 831, 833, 834; 353/20, 31, 33, 34, 37, 81; 349/5, 8

(56) References Cited

U.S. PATENT DOCUMENTS

| | | | | |
|---|---|---|---|---|
| 2,449,287 A | * | 9/1948 | Flood | |
| 2,642,487 A | * | 6/1953 | Schroeder | |
| 4,943,154 A | * | 7/1990 | Miyatake et al. | ............. 353/31 |
| 5,042,912 A | * | 8/1991 | Sato et al. | .................. 359/638 |
| 5,168,351 A | * | 12/1992 | Bradley et al. | |
| 5,181,054 A | * | 1/1993 | Nicolas et al. | ................ 353/37 |
| 5,221,998 A | * | 6/1993 | Sugahara | .................... 359/831 |
| 5,237,442 A | * | 8/1993 | Khoe et al. | ................. 359/638 |
| 5,743,610 A | * | 4/1998 | Yajima et al. | ................ 353/81 |
| 5,973,840 A | | 10/1999 | Itoh et al. | |
| 6,072,635 A | * | 6/2000 | Hashizume et al. | ........ 359/634 |
| 6,097,544 A | * | 8/2000 | Edlinger et al. | ............ 359/634 |
| 6,101,041 A | * | 8/2000 | Ishibashi et al. | ............ 358/634 |
| 6,109,751 A | | 8/2000 | Hashizume et al. | |

FOREIGN PATENT DOCUMENTS

GB 754590 * 8/1956

* cited by examiner

*Primary Examiner*—Ricky D. Shafer
(74) *Attorney, Agent, or Firm*—Oblon, Spivak, McClelland, Maier & Neustadt, P.C.

(57) ABSTRACT

A red-reflecting film and a blue-reflecting film are formed in a substantially X shape on joint surfaces defined by the respective side faces of four columnar prisms or right-angle prisms. The red-reflecting film is continuously formed without separating at an intersection of the two reflecting films. The blue-reflecting film is, on the other hand, divided into two pieces by the red-reflecting film and an adhesive. It is preferable that that four columnar prisms are obtained from one block of sheet glass. This arrangement ensures an improvement in properties of a resulting light-selective prism.

1 Claim, 12 Drawing Sheets

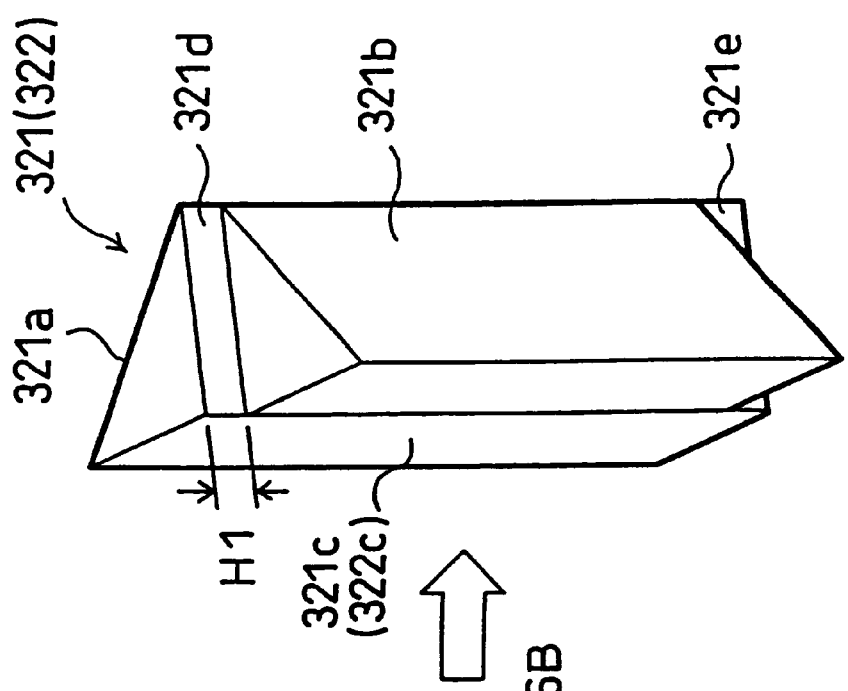
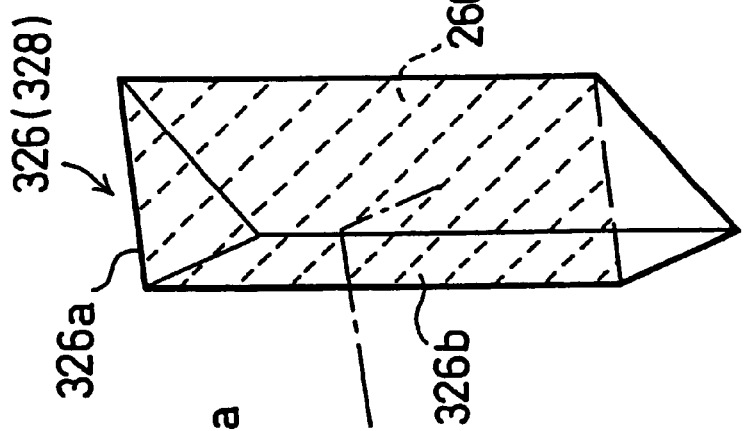
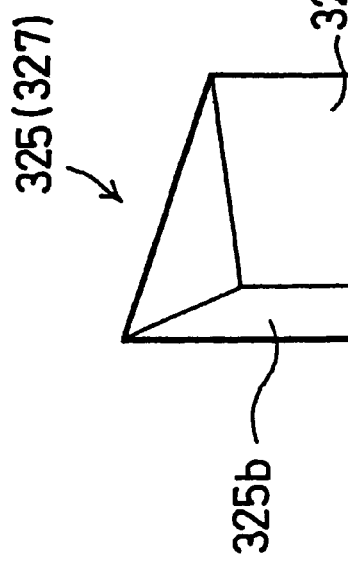
Fig. 3 (A)  Fig. 3 (B)  Fig. 3 (C)

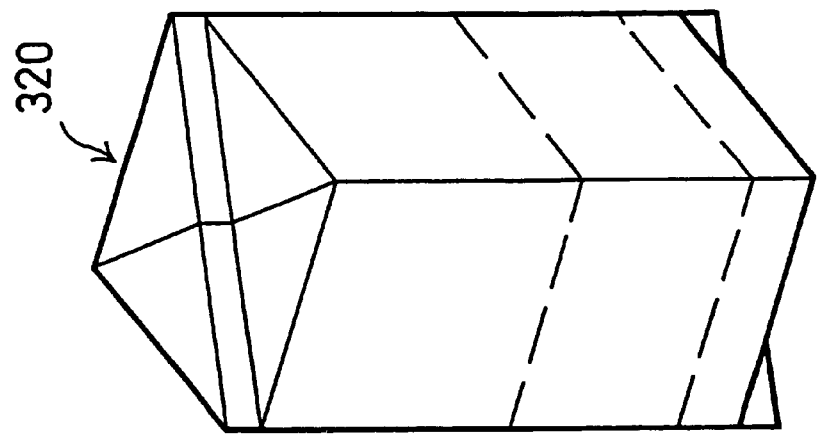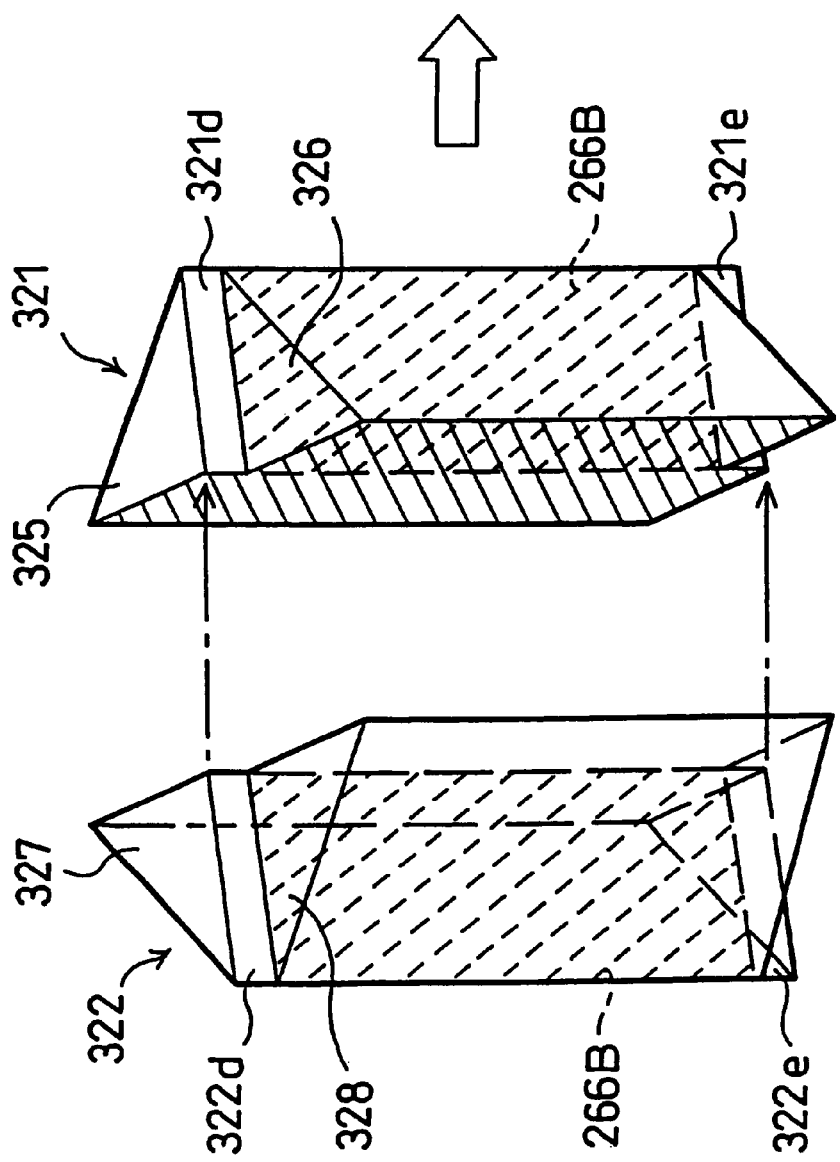

PROJECTOR USING A LIGHT-SELECTIVE PRISM

This application is a Division of application Ser. No. 09/285,003 filed on Apr. 1, 1999.

BACKGROUND OF THE INVENTION

1. Field of the Invention

The present invention relates to a light-selective prism, a projection display apparatus using the same, and a method of manufacturing the light-selective prism.

2. Description of the Related Art

A cross dichroic prism is often used as the light-selective prism in a projection display apparatus that projects a color image. The cross dichroic prism has two different types of dichroic films that are arranged to cross in a substantially X shape. The cross dichroic prism has the function of a color combiner that combines three colored light components, red, green, and blue, together and emits a composite light beam in a specified direction.

FIG. 12 shows an essential part of a conventional projection display apparatus. The projection display apparatus includes three liquid crystal light valves 42, 44, and 46, a cross dichroic prism 48, and a projection lens 50. Red-reflecting films 48R and blue-reflecting films 48B are formed in a substantially X shape in the cross dichroic prism 48. The cross dichroic prism 48 combines the three colored light components, red, green, and blue, modulated by the three liquid crystal light valves 42, 44, and 46 and emits a composite light beam in the direction of the projection lens 50. The projection lens 50 focuses the composite light beam on a projection screen 52.

The cross dichroic prism 48 is generally manufactured by gluing the respective side faces of four columnar prisms having an identical size together. The red-reflecting films 48R are formed previously on predetermined side faces of two columnar prisms, so as to be located on the same plane when the four columnar prisms are glued together. In a similar manner, the blue-reflecting films 48B are formed previously on predetermined side faces of two columnar prisms.

The red-reflecting film 48R reflects only the red light component while transmitting the other colored light components. The blue-reflecting film 48B reflects only the blue light component while transmitting the other colored light components. Dielectric multi-layered films referred to as dichroic films are generally used for the reflecting films having such properties. These reflecting films bend the light components emitted from the liquid crystal light valves 42 and 46 by 90 degrees and thereby cause the light components to be uniformly directed to the projection lens 50. It is accordingly preferable that the reflecting films formed in a substantially X shape in the cross dichroic prism are respectively located on identical planes.

When the four columnar prisms of an identical size are glued together to constitute a cross dichroic prism, it is rather difficult to join the columnar prisms together with high accuracy in order to enable the red-reflecting films 48R and the blue-reflecting films 48B to be located respectively on identical planes. The poor accuracy causes both the red-reflecting films 48R and the blue-reflecting films 48B to have gaps and differences in level in the vicinity of the intersections of the respective reflecting films on the substantial center of the cross dichroic prism. The reflection properties and the transmission properties of the red-reflecting film 48R and the blue-reflecting film 48B are thus varied along the pass of the light beams passing through the vicinity of the intersections. This results in deteriorating properties of the cross dichroic prism 48. When such a cross dichroic prism is applied to the projection display apparatus, streaks due to the scattering of light in the cross dichroic prism are observed on the substantial center of a projected image. Another problem is that some color light reflected at center of the cross dichroic prism makes duplicate images on the center of the display, and the respective colored light components make displayed color component images of different sizes, accordingly.

The cross dichroic prism is also used to divide light into a plurality of light components. The problem of the deteriorating properties of the cross dichroic prism also arises in this case. A variety of light-selective prisms, in which light-selective films that selectively transmit or reflect light components are formed in a substantially X shape, other than the cross dichroic prism may be used as the optical elements. The problem of the deteriorating properties is commonly found in the variety of light-selective prisms.

SUMMARY OF THE INVENTION

The object of the present invention is thus to provide a technique that improves properties of a light-selective prism.

At least part of the above and the other related objects of the present invention is attained by a light-selective prism that has two different types of light-selective films crossing in a substantially X shape. The light-selective prism includes: four columnar prisms that are joined together on respective side faces thereof; and two light-selective films that are formed along the side faces of the four columnar prisms to cross in a substantially X shape, wherein one of the two light-selective films is continuously formed without separating at an intersection of the two light-selective films.

Since one of the two light-selective films is continuously formed without separating at an intersection of the two light-selective films, the properties of the continuous light-selective film is improved in the vicinity of the intersection of the two light-selective films that are arranged in a substantially X shape. This accordingly ensures an improvement of the properties of the resulting light-selective prism.

The one of the two light-selective films may be formed continuously on a curved surface.

The light-selective prism of this structure enables adjustment of the size of the image that is created by the light reflected from the light-selective film formed on the curved surface.

The light-selective film of the present invention may be manufactured according to one of the following methods. A first method manufactures a light-selective prism by joining four columnar prisms together on respective side faces thereof. The first method includes the steps of: (A) preparing two pairs of prisms by: i) providing two sets of two columnar prisms each having two joint side faces, ii) forming a first light-selective film on one of four joint side faces of the two columnar prisms of each set, and iii) gluing each set of two columnar prisms together across the first light-selective film; (B) evenly polishing joint faces of the two pairs of prisms across which the two pairs of prisms are to be joined together; (C) forming a second light-selective film over the even joint face of a selected one of the two pairs of prisms, the second light-selective film being continuous across a joint of the two columnar prisms in the selected pair; and (D) joining the two pairs of prisms together, so as to obtain a prism assembly.

The first method of the present invention causes the second light-selective film to be formed continuously across a joint of the two columnar prisms over one of the even joint surfaces, which belongs to a selected pair out of the two pairs of prisms. This arrangement effectively improves the properties of the second light-selective film.

In accordance with one preferable application of the first method, each set of two columnar prisms is a combination of a relatively long columnar prism and a relatively short columnar prism, and each pair of prisms are prepared in such a manner that one side face of the relatively long columnar prism, which is to contact with and glued to the relatively short columnar prism, has exposed portions on both longitudinal ends of the side face. In the step (D), the two pairs of prisms are joined together in such a manner that the exposed portions of each pair of prisms are in contact with a predetermined common reference surface.

This method enables the first light-selective films formed respectively on the two pairs of prisms to be positioned according to the predetermined reference plane and thereby to be present on the same plane.

The first method may further include the step of: cutting the light-selective prism out of the prism assembly obtained in the step (D).

This step enables a large number of light-selective prisms to be obtained from the prism assembly. The height of the light-selective prism can be set arbitrarily when the light-selective prism is cut out of the prism assembly. This gives a light-selective prism having a desired height.

In the first method, the step (B) may include the step of polishing at least one of the joint faces on which the second light-selective film is to be formed in the step (C), to a curved surface.

The light-selective prism manufactured in this manner enables regulation of the size of the image that is created by the light reflected from the light-selective film formed on the curved surface.

In the first method of the present invention, it is preferable that at least the joint side faces of the two columnar prisms of each pair of prisms, are polished.

This arrangement enables the first light-selective film to be formed on one of the polished joint side faces.

In this case, one possible arrangement further includes the step of: polishing an outer face of the prism assembly obtained in the step (D).

This enables the streaks and flaws on the glass surface, which may occur in each manufacturing step, to be removed on occasion.

Another possible arrangement further includes the step of: cutting a small prism out of the prism assembly obtained in the step (D), and polishing an outer face of the small prism.

A second method manufactures a light-selective prism by joining four columnar prisms together on respective side faces thereof. The second method includes the steps of: (A) providing a block of sheet glass having polished top and bottom faces; (B) forming a first light-selective film on one of the top and bottom faces of the sheet glass; (C) cutting the block of sheet glass with the first light-selective film formed thereon to obtain four columnar prisms, wherein two columnar prisms have faces on which the first light-selective film is formed and two columnar prisms do not have faces on which the first light-selective film is formed; (D) preparing two pairs of prisms by joining respective one of the two columnar prisms having the first light-selective film with respective one of the remaining two columnar prisms without the first light-selective film across the first light-selective film; (E) evenly polishing joint faces of the two pairs of prisms across which the two pairs of prisms are to be joined together; (F) forming a second light-selective film over the even joint face of a selected one of the two pairs of prisms, the second light-selective film being continuous across a joint of the two columnar prisms in the selected pair; and (G) joining the two pairs of prisms together, so as to obtain a prism assembly.

Like the first method discussed previously, the second method of the present invention causes the second light-selective film to be formed continuously across a joint of the two columnar prisms over one of the even joint surfaces, which belongs to a selected pair out of the two pairs of prisms. This arrangement effectively improves the properties of the second light-selective film. In the steps (A) through (C) of the second method, the four columnar prisms are prepared by dividing one block of sheet glass into four pieces. This enables the four columnar prisms to have a uniform refractive index. The uniform refractive index effectively prevents a variation in size of the displayed image due to a difference between the optical paths of the light components transmitting through the resulting light-selective prism.

A cross dichroic prism, which is one embodiment of the light-selective prism according to the present invention, may be applied to a projection display apparatus. The present invention is accordingly directed to a projection display apparatus that projects and displays an image. The projection display apparatus includes: an illumination system that emits illumination light; a color separator that divides the illumination light into three colored light components; three light modulator that respectively modulate the three colored light components based on given image signals respectively; a cross dichroic prism that combines the three colored light components modulated by the three light modulator to a composite light beam; and a projection optical system that projects the composite light beam combined by the cross dichroic prism. The cross dichroic prism comprising: four columnar prisms that are joined together on respective side faces thereof; and two dichroic films that are formed along the side faces of the four columnar prisms to cross in a substantially X shape, wherein one of the two dichroic films is continuously formed without separating at an intersection of the two dichroic films.

This projection display apparatus generates the composite light beam using the cross dichroic prism according to the present invention. This structure relieves the problem that streaks due to the scattering of light in the cross dichroic prism are observed on the substantial center of a projected image.

BRIEF DESCRIPTION OF THE DRAWINGS

FIGS. 3(A)–3(C) show a process of manufacturing a pair of prisms;

FIGS. 6(A)–6(C) show a process of gluing the two pairs of prisms 321 and 322 together, which are prepared according to the method of FIGS. 3(A) through 5(C);

DESCRIPTION OF THE PREFERRED EMBODIMENTS

A. First Light-Selective Prism

Figure 1:
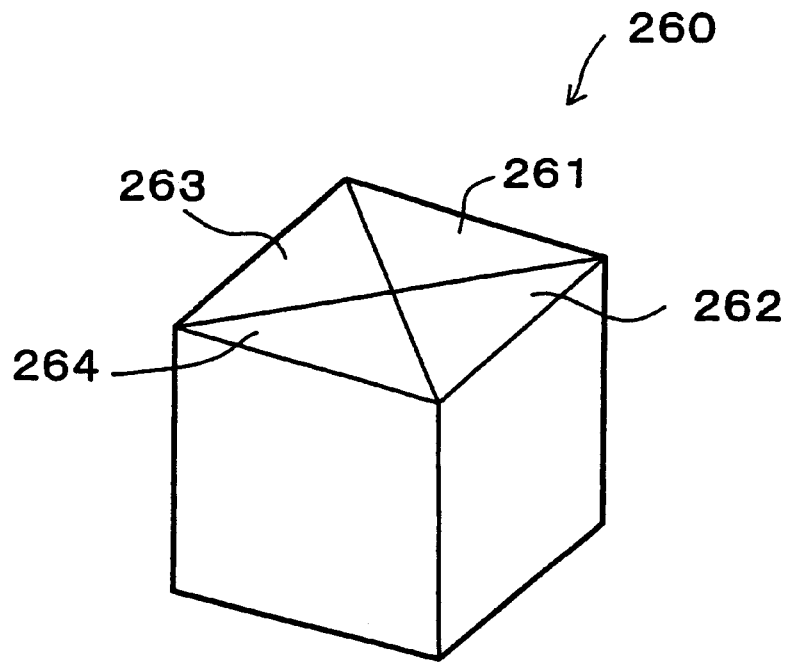
FIGS. 1(A) and 1(B) illustrate a cross dichroic prism 260 as a first embodiment of the light-selective prism according to the present invention.
Figure 1:
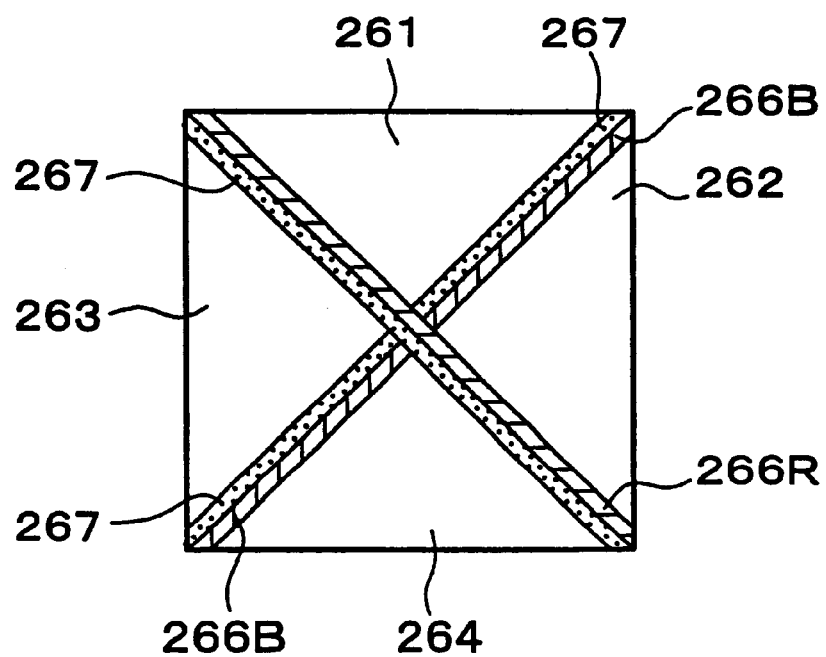

FIGS. 1(A) and 1(B) illustrate a cross dichroic prism 260 as a first embodiment of the light-selective prism according to the present invention. The cross dichroic prism 260 includes four right-angle optical prisms (columnar optical prisms) 261, 262, 263, and 264 as shown in FIG. 1(A). The four right-tangle optical prisms 261 through 264 (hereinafter referred to as the right-angle prisms or columnar prisms) have the shape of a right isosceles triangular prism having an identical height. The cross dichroic prism 260 is a quadratic prism (either a rectangular parallelepiped or a cube) obtained by joining the right-angle prisms 261 through 264 on right-angle side faces (hereinafter simply referred to as the 'right-angle faces' or 'joint surfaces') via an adhesive 267.

As shown in FIG. 1(B), a red-reflecting film 266R and blue-reflecting films 266B are arranged in a substantially X shape on the joint surfaces defined by the right-angle faces of the four right-angle prisms 261 through 264. The red-reflecting film 266R is a dichroic film or a light-selective film that is continuously formed over the whole red-reflecting film-forming face, which is defined by the joint surface between the two right-angle prisms 261 and 263 and the joint surface between the two right-angle prisms 262 and 264. The blue-reflecting films 266B are dichroic films formed respectively on the joint surface between the two right-angle prisms 261 and 262 and on the joint surface between the two right-angle prisms 263 and 264. The blue-reflecting films 266B formed on these two joint surfaces are separated from each other by the red-reflecting film 266R and the adhesive 267.

In the cross dichroic prism 260 of the embodiment, the red-reflecting film 266R is continuously formed over the whole surface of one of the two film-forming faces that cross in a substantially X shape. This arrangement effectively prevents deterioration of the properties, that is, the reflection and transmission properties, of the red-reflecting film 266R even on the center of the cross dichroic prism 260. The two blue-reflecting films 266B are separated from each other by the red-reflecting film 266R and the adhesive 267. The respective divisions of the blue-color reflecting face, that is, the two blue-reflecting films 266B, are positioned with high accuracy to be located on the same plane. This arrangement ensures the blue-color reflecting face having good reflection properties and transmission properties, although there is a certain loss due to the separation. This further improves the properties of the cross dichroic prism 260. The blue-reflecting film 266B is divided into two portions since the blue light has a lower spectral luminous efficiency than that of the red light; that is, the resolution of the human eyes is lower to the blue light than to the red light.

The four columnar prisms 261, 262, 263, and 264 may have the shape of a non-isosceles triangular prism having a substantially right angle, instead of the shape of the right isosceles triangular prism.

B. First Manufacturing Method

Figure 2:
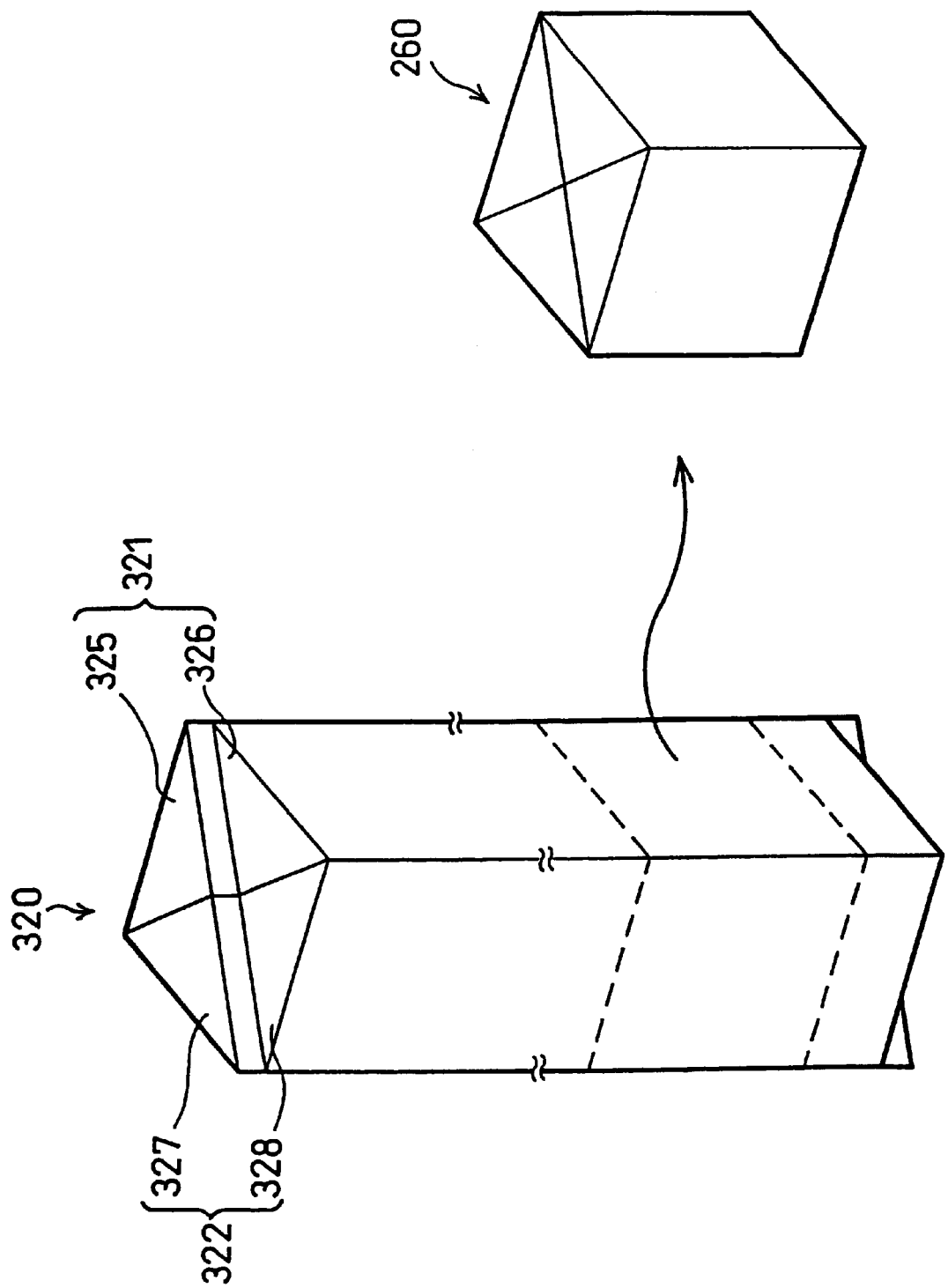
FIG. 2 shows a process of cutting the cross dichroic prism 260 out of a prism assembly 320.

The following describes a first manufacturing method of the cross dichroic prism 260 shown in FIGS. 1(A) and 1(B) by referring to FIGS. 2 through 8. FIG. 2 shows a process of cutting the cross dichroic prism 260 out of a prism assembly 320. The method of manufacturing the cross dichroic prism 260 first prepares a prism assembly 320, which extends in the longitudinal direction as shown in FIG. 2, and then cuts a prism of a desired length out of the prism assembly 320.

The prism assembly 320 is manufactured by joining a first pair of prisms 321 with a second pair of prisms 322. The first pair of prisms 321 include a relatively long right-angle prism 325 (hereinafter referred to simply as the 'long right-angle prism') and a relatively short right-angle prism 326 (hereinafter referred to simply as the 'short right-angle prism') that are joined with each other. In a similar manner, the second pair of prisms 322 include a long right-angle prism 327 and a short right-angle prism 328. The short right-angle prisms 326 and 328 are required to have the shorter lengths than those of the long right-angle prisms 325 and 327. The lengths of the long right-angle prisms may not be identical with each other, and the lengths of the short right-angle prisms may not be identical with each other. The long right-angle prisms of an identical length and the short right-angle prisms of an identical length, however, minimizes the variety of right-angle prisms and facilitates the manufacture. In the respective drawings of the embodiment, the long right-angle prisms are shown in an identical size, and the short right-angle prisms are also shown in an identical size.

Figure 4:
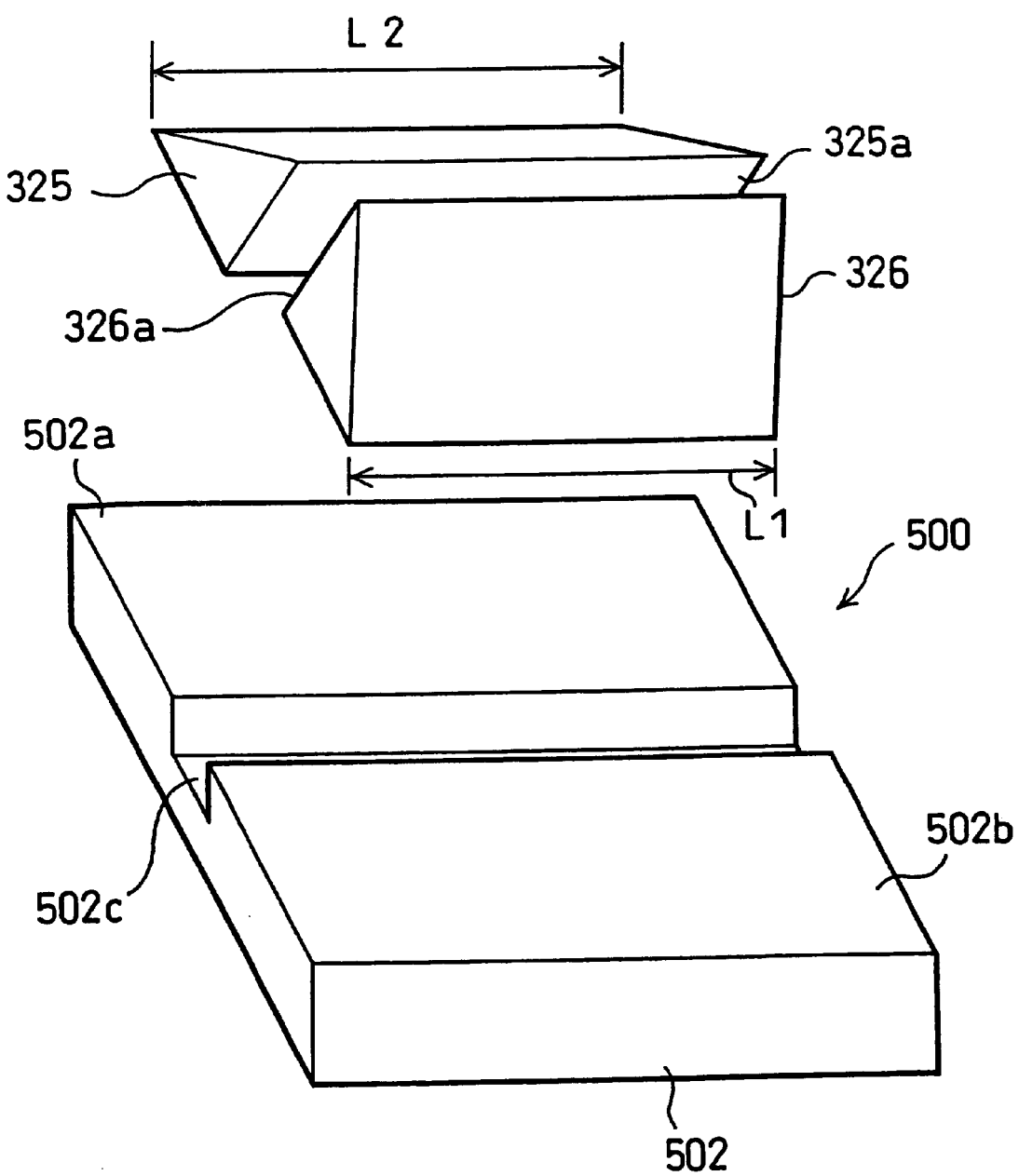
FIG. 4 is a perspective view illustrating a first assembling jig 500.

FIGS. 3(A)–3(C) show a process of manufacturing the first pair of prisms 321 and the second pair of prisms 322. The first pair of prisms 321 are produced in the following manner. The process first provides the long right-angle prism 325 shown in FIG. 3(A) and the short right-angle prism 326 shown in FIG. 3(B). The long right-angle prism 325 and the short right-angle prism 326 respectively have three side faces, which are polished evenly to form even light-transmitting surfaces. The short right-angle prism 326 has a right-angle face 326a that forms the blue-reflecting film 266B (shown by slant broken lines in FIG. 3(B)). The blue-reflecting film 266B is a dielectric multi-layered film that is obtained by laying a plurality of inorganic thin films one upon another in layer by vacuum deposition or sputtering. The process then joins a right-angle face 325a of the long right-angle prism 325 with the right-angle face 326a of the short right-angle prism 326 to produce the first pair of prisms 321 shown in FIG. 3(C). The right-angle faces are joined with each other in such a manner that exposed portions 3219d and 321e are left in the top and bottom parts of the right-angle face 325a of the long right-angle prism 325. A first assembling jig 500 shown in FIG. 4 is used for the joint. The first assembling jig 500 has a base plate 502 including a pair of reference face elements 502a and 502b disposed on either ends thereof and a substantially rectangular groove element 502c formed between the reference face elements 502a and 502b. The reference face elements 502a and 502b are worked to have upper faces that are located substantially on the same plane. The groove element 502c is a relief portion that receives the overflow of the adhesive applied on the joint.

The two right-angle prisms 325 and 326 are joined with each other in the following manner. The process first applies the adhesive on at least one of the joint surfaces of the two right-angle prisms 325 and 326 and glues the right-angle prisms 325 and 326 together. The process places the two prisms 325 and 326 joined with each other on the base plate 502 or more specifically on the reference face elements 502a and 502b as shown in FIG. 4. The two prisms 325 and 326 are pressed against the reference face elements 502a and 502b. This enables the two prisms 325 and 326 to be set in parallel to the longitudinal axis thereof.

After setting the relative positions of the two right-angle prisms 325 and 326, the process waits for some time to cause the adhesive applied on the joint surface to be cured. This gives the first pair of prisms 321.

According to the similar process, the second pair of right-angle prisms 322 are obtained by joining the right-angle prism 327 with the right-angle prism 328, on which the blue-reflecting film 266B is formed.

Figure 5A:
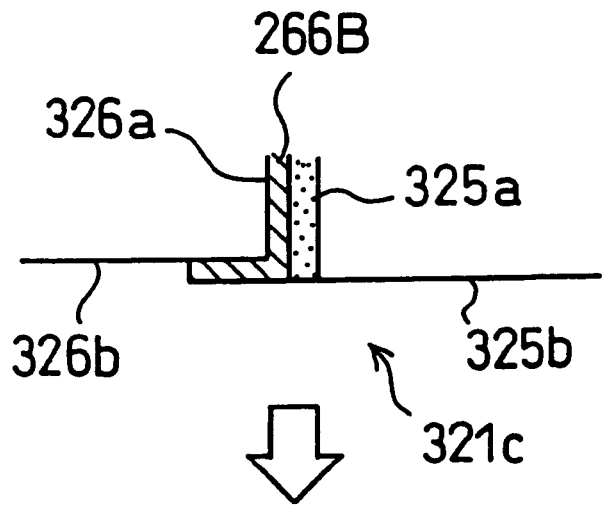
FIGS. 5(A)–5(C) are enlarged views illustrating a joint surface 321c of a first pair of prisms 321.
Figure 5B:
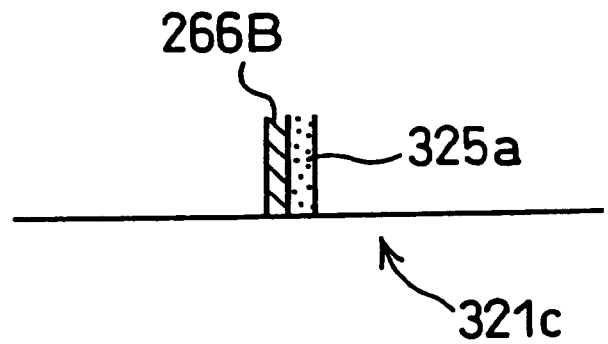
Figure 5C:
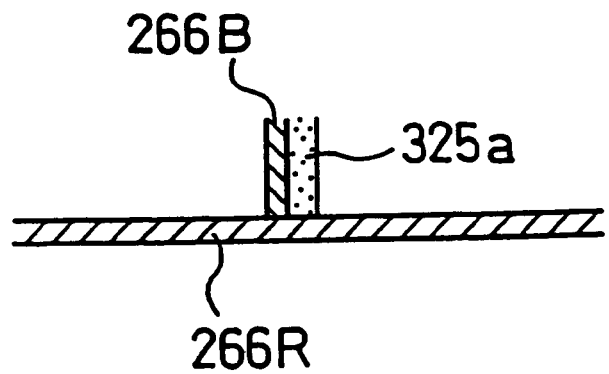

FIGS. 5(A)–5(C) are enlarged views illustrating a joint surface 321c of the first pair of prisms 321 manufactured in the above manner. The joint surface 321c is interposed between the two right-angle faces 321a and 321b of the first pair of prisms 321. The first pair of prisms 321 are joined with the second pair of prisms 322 across the joint surface 321c as shown in FIG. 3(C).

The joint surface 321c includes the respective right-angle faces 325b and 326b of the two right-angle prisms 325 and 326 and is pressed against the reference face elements 502a and 502b of the first assembling jig 500. The blue-reflecting film 266B formed on the right-angle face 326a may have an extension that goes round a perpendicular corner of the right-angle face 326b as shown in FIG. 5(A). The right-angle face 325b and the right-angle face 326b may have a little difference in level due to a difference between the pressing forces of the right-angle prisms 325 and 326 against the first assembling jig 500. This often results in the uneven joint surface 321c of the first pair of right-angle prisms 321. The process accordingly polishes the joint surface 321c to have the even surface as shown in FIG. 5(B). The process then forms the red-reflecting film 266R on the even joint surface 321c as shown in FIG. 5(C). Like the blue-reflecting film 266B, the red-reflecting film 266R is prepared by vapor deposition or sputtering. Formation of the red-reflecting film 266R on the even face enables the red-reflecting film 266R to consist of one continuous film. This prevents the scattering of light especially in the vicinity of the joint between the two right-angle prisms 325 and 326 and thereby causes no streaks on the displayed image due to the scattering of light. When the joint surface 321c is a plane, the reflecting films can be formed on the same plane with high accuracy. Even when the light is reflected by 90 degrees, the left-side image and the right-side image accordingly have the same size on the display. The 'even surface' in the present invention represents a continuous surface without any steps and does not mean a geometrically strict plane.

Like the first pair of prisms 321, the second pair of prisms 322 have a polished joint surface 322c. When the red-reflecting film 266R is formed on the joint surface 321c of the first pair of prisms 321, it is not required to form the red-reflecting film 266R on the joint surface 322c of the second pair of prisms 322. The red-reflecting film 266R may be formed on the joint surface 322c of the second pair of prisms 322, instead of on the joint surface 321c of the first pair of prisms 321.

The comparison between the two color lights, red and blue, reflected by the reflecting face shows that the red light has a higher spectral luminous efficiency; that is, the red light is more conspicuous to the naked eyes. It is accordingly desirable that the red-reflecting film forms an even surface with substantially no difference in level. The manufacturing method of this embodiment enables the red-reflecting film 266R shown in FIG. 5(C) to be formed continuously over the whole joint surface 321c. The method accordingly gives an excellent cross dichroic prism. The spectral luminous efficiency decreases in the sequence of green, red, and blue. When a green-reflecting film is used instead of the red-reflecting film or the blue-reflecting film, it is preferable that the green-reflecting film is formed on the joint surface 321c according to the method shown in FIGS. 5(A)–5(C).

Figure 7:
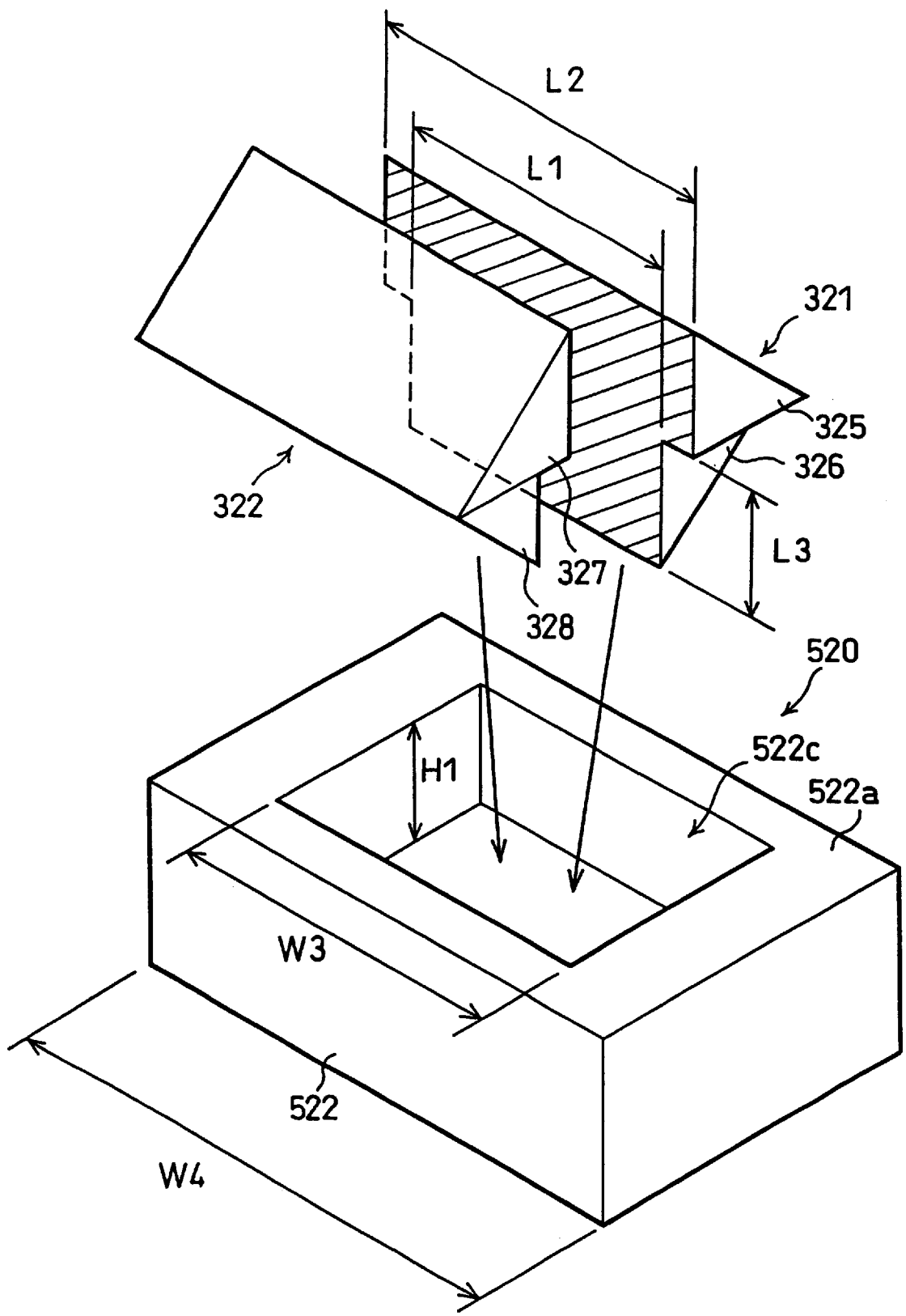
FIG. 7 is a perspective view illustrating a second assembling jig 520.

FIGS. 6(A)–6(C) show a process of gluing the two pairs of prisms 321 and 322 together, which are prepared according to the method of FIGS. 3(A) through 5(C). The second pair of prisms 322 shown in FIG. 6(A) are joined with the first pair of prisms 321 shown in FIG. 6(B) in such a manner that the short prisms adjoin to each other and the long prisms adjoin to each other. This gives the prism assembly 320 shown in FIG. 6(C). A second assembling jig 520 shown in FIG. 7 is used for the joint. The second assembling jig 520 has a base plate 522 including a frame-like reference face element 522a and a slot 522c formed in the center of the reference face element 522a. The upper surface of the reference face element 522a is worked with high accuracy. A width W3 of the slot 522c is set to be a little greater than a length L1 of the short right-angle prism 326 in the longitudinal direction. A depth H1 of the slot 522c is set to be greater than a width L3 of the right-angle faces of the short right-angle prisms 326 and 328. A width of the base plate 522 is set to be greater than a length L2 of the long right-angle prisms 325 and 327 in the longitudinal direction.

The following method is used to glue the two pairs of prisms 321 and 322 together. The process first applies the adhesive on at least one of the joint surfaces and places the two pairs of prisms 321 and 322 on the second assembling jig 520 to make the short right-angle prisms 326 and 328 received in the slot 522c as shown in FIG. 7. The long right-angle prisms 325 and 327 are here pressed against the upper surface of the reference face element 522a. This sets the relative positions of the two pairs of prisms 321 and 322, so that the blue-reflecting film 266B formed inside the first pair of prisms 321 and the blue-reflecting film 266B formed inside the second pair of prisms 322 are located on the same plane.

Figure 8:
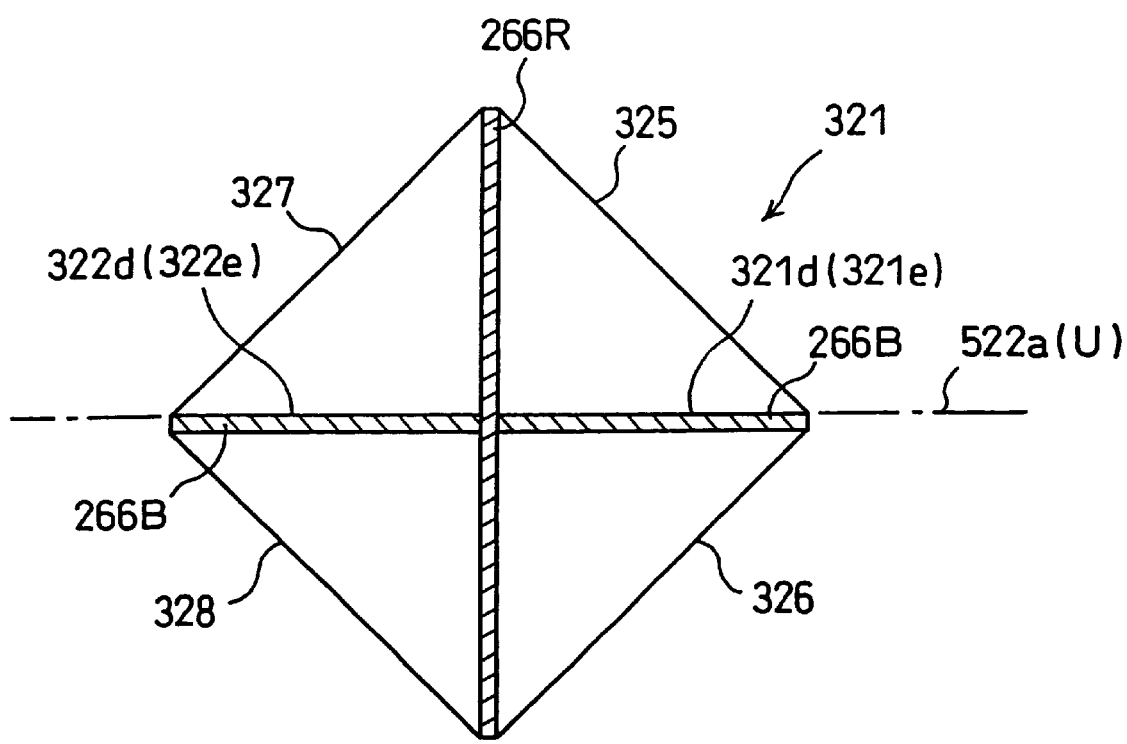
FIG. 8 is an enlarged side view illustrating the two pairs of prisms 321 and 322 placed on the second assembling jig 520.

FIG. 8 is an enlarged side view illustrating the two pairs of prisms 321 and 322 placed on the second assembling jig 520. For simplicity of explanation, FIG. 8 is seen through the reference face element 522a. Only exposed portions 321d, 321e, 322d, and 322e, which have no reflecting film formed thereon as shown in FIG. 6, out of the right-angle faces 325a and 327a of the two long right-angle prisms 325 and 327 (that is, the surfaces glued to or joined with the short right-angle prisms 326 and 328) are brought into contact with an upper surface 522a(U) of the reference face element 522a. These exposed portions 321d, 321e, 322d, and 322e have polished faces. Placing these exposed portions 321d, 321e, 322d, and 322e on the upper surface 522a(U) of the reference face element 522a of the base plate 522 accordingly ensures the high degree of flatness on these polished faces. The 'degree of flatness' here means the degree of continuity of the surface (that is, the degree of evenness in level). As shown in FIGS. 6(A) and 6(B), the blue-reflecting film 266B is formed on the polished, joint surface that is located on the identical face with the exposed portions 321d and 321e, whereas the blue-reflecting film 266B is also formed on the polished, joint surface that is located on the identical face with the exposed portions 322d and 322e. Joining the two pairs of prisms 321 and 322 as shown in FIG. 7 enables the blue-color reflecting face consisting of the two blue-reflecting films 266B to have a high degree of flatness.

After setting the relative positions of the two pairs of prisms 321 and 322 with high accuracy, the process waits for some time to cause the adhesive applied on the joint surface to be cured. This gives the prism assembly 320 assembled with high accuracy as shown in FIG. 6(C). An ultraviolet-curing adhesive having a low viscosity may be used to glue the four right-angle prisms together. This adhesive advantageously requires the short curing time and causes less evolution of heat during the cure.

The prism assembly 320 manufactured in the above manner is then cut to a prism of a desired length as the cross dichroic prism 260 having two cutting surfaces that are practically perpendicular to the longitudinal axis and substantially parallel to each other as shown in FIG. 2. The method of cutting a prism of a desired length out of the relatively large prism assembly 320 facilitates the production of a relatively small cross dichroic prism. Application of the cross dichroic prism manufactured by the above method for a projection display apparatus enables reduction in size of the whole projection display apparatus. The prism assembly 320 itself may be used for the cross dichroic prism.

In the cross dichroic prism 260 manufactured by the above method, the red-reflecting film 266R is continuously formed over the whole joint surface of the two pairs of prisms. This arrangement effectively improves the reflection properties and the transmission properties of the red-reflecting film 266R and thereby ensures an improvement in properties of the cross dichroic prism 260. Although the two blue-reflecting films 266B are separated from each other by the red-reflecting film 266R, the two blue-reflecting films 266B are positioned with high accuracy to be located on the same plane. This arrangement ensures the blue-color reflecting face having the good reflection properties and transmission properties, although there is a certain loss due to the separation. This further improves the properties of the cross dichroic prism 260.

Although the above manufacturing method uses the four right-angle prisms 325; 326, 327, and 328, each of which has three evenly polished side faces, the right-angle prisms are not restricted to this structure. For example, each of the two right-angle prisms constituting a pair may have at least one polished side face that comes into contact with and is glued to one polished side face of the other right-angle prism. In this case, unpolished side faces corresponding to the joint surfaces 321c and 322c, across which the two pairs of prisms 321 and 322 are joined with each other, are polished by the process shown in FIGS. 5(A)–5(C). The remaining unpolished side faces corresponding to the outer side faces of the cross dichroic prism 260 may be polished after the prism assembly 320 has been manufactured or after the cross dichroic prism 260 has been cut out of the prism assembly 320. This method enables the streaks and flaws on the glass surface, which may occur in each manufacturing step, to be removed on occasion.

C. Second Light-Selective Prism

FIGS. 9(A) and 9(B) illustrate another cross dichroic prism 260A as a second embodiment of the light-selective prism according to the present invention. The cross dichroic prism 260A includes four columnar optical prisms 261A, 262A, 263A, and 264A (hereinafter referred to as the columnar prisms) as shown in FIG. 9(A). The four columnar prisms 261A through 264A have the shape of a pseudo triangular prism having an identical height. The cross dichroic prism 260A is a pseudo quadratic prism obtained by gluing the columnar prisms 261A through 264A together on the respective two faces, which constitute each angle, via an adhesive 267.

As shown in FIG. 9(B), a red-reflecting film 266R and blue-reflecting films 266B are arranged in a substantially X shape on the side faces (hereinafter referred to as the 'joint surfaces'), across which the four columnar prisms 261A through 264A are joined together. The red-reflecting film 266R is a dichroic film or a light-selective film that is continuously formed over the whole red-reflecting film-forming face, which is defined by the joint surface between the two columnar prisms 261A and 263A and the joint surface between the two columnar prisms 262A and 264A. The blue-reflecting films 266B are dichroic films formed respectively on the joint surface between the two columnar prisms 261A and 262A and on the joint surface between the two columnar prisms 263A and 264A. The blue-reflecting films 266B formed on these two joint surfaces are separated from each other by the red-reflecting film 266R and the adhesive 267.

Like in the cross dichroic prism 260 of the first embodiment shown in FIG. 1, in the cross dichroic prism 260A of the second embodiment, the red-reflecting film 266R is continuously formed over the whole surface of one of the two film-forming faces that cross in a substantially X shape. This arrangement effectively prevents deterioration of the properties, that is, the reflection and transmission properties, of the red-reflecting film 266R even on the center of the cross dichroic prism 260A. In the same manner as the cross dichroic prism 260, the two blue-reflecting films 266B are separated from each other by the red-reflecting film 266R and the adhesive 267 in the cross dichroic prism 260A. The respective divisions of the blue-color reflecting face, that is, the two blue-reflecting films 266B, are positioned with high accuracy to be located on a continuous identical surface (on the same plane in FIG. 9). This arrangement ensures the blue-color reflecting face having good reflection properties and transmission properties, although there is a certain loss due to the separation. This accordingly enables an improvement in properties of the cross dichroic prism 260A like those of the cross dichroic prism 260 discussed above.

The film-forming face, on which the red-reflecting film 266R is formed, has a curved surface as shown in FIG. 9(B). The curved surface may be a spherical surface, an ellipsoidal surface, or a surface consisting of a series of flat planes each having different directions. Formation of the red-reflecting film 266R on the curved film-forming face enables the direction of reflection of the red light from the red-reflecting film 266R to be regulated according to the position of the red-reflecting film 266R. This arrangement ensures a change in size of the displayed image by the red light. When the cross dichroic prism 260A is applied to the projection display apparatus, this arrangement effectively prevents deterioration of the image quality due to chromatic aberration occurring in the projection optical system.

The cross dichroic prism 260A may be manufactured according to the first manufacturing method discussed above. In this case, the step of polishing the joint surface 321c evenly, which is described previously with the drawing of FIG. 5(B), polishes the joint surface 321c in a curved shape. This arrangement enables the film-forming face to form a curved surface.

D. Second Manufacturing Method

Figure 10A:
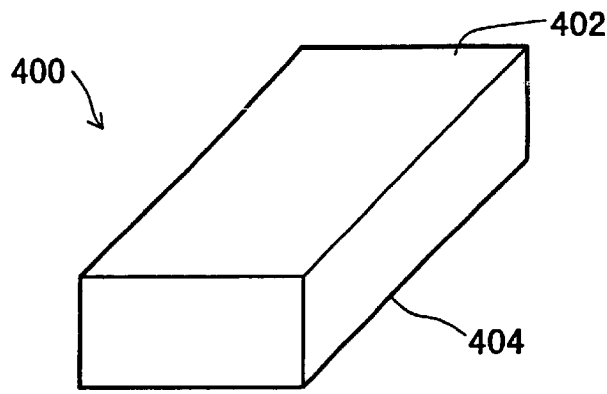
FIGS. 10(A)–10(D) show a process of providing four columnar prisms in a second manufacturing method of the cross dichroic prism.
Figure 10B:
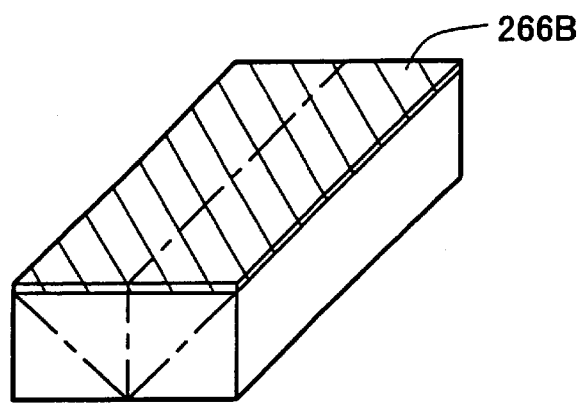
Figure 10C:
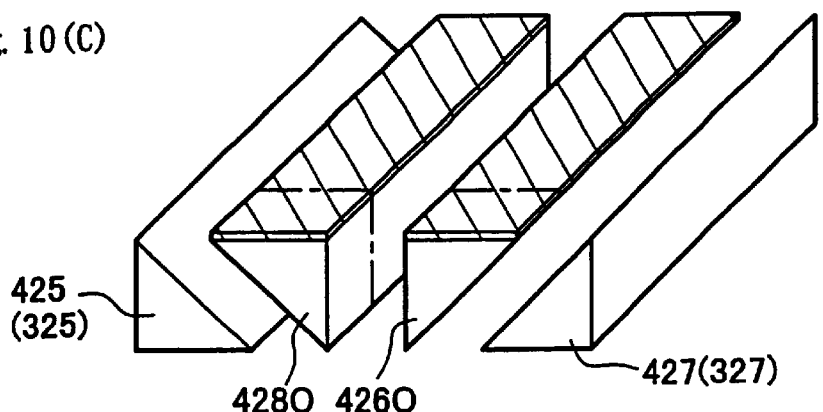
Figure 10D:
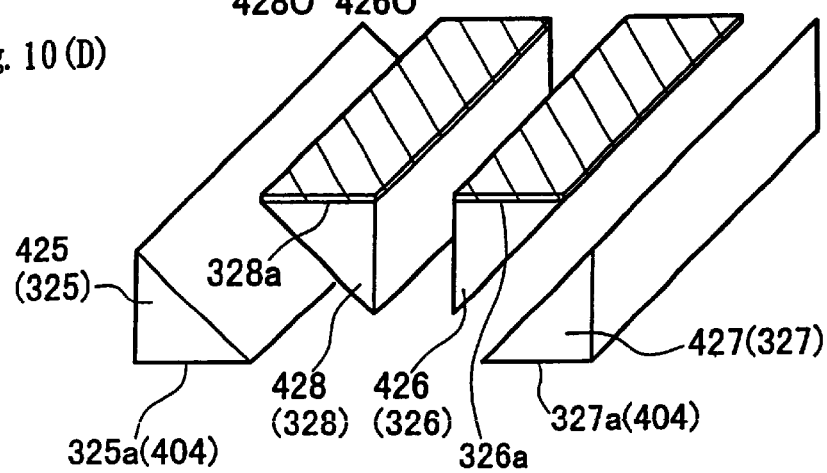

FIGS. 10(A)–10(D) show a process of providing four columnar prisms in a second manufacturing method of the cross dichroic prism. The process first provides a block of optical sheet glass 400, for example, a block of white sheet glass, as shown in FIG. 10(A). The block of sheet glass 400 used here has a uniform refractive index. The process subsequently polishes a top face 402 and a bottom face 404 of the sheet glass 400 evenly and forms a blue-reflecting film 266B on the top face 402, which is shown as a hatched portion in FIG. 10(B). The process divides the sheet glass 400 along one-dot chain lines shown in FIG. 10(B) into four pieces, thereby providing four columnar prisms 425, 426o, 427, and 428o as shown in FIG. 10(C). In the case where the columnar prisms 425 and 427 among these four columnar prisms 425, 426o, 427, and 428o are right-tangle prisms, these prisms 425 and 427 correspond to the long right-angle prisms 325 and 327 shown in FIG. 2. The process then cuts the columnar prisms 426o and 428o along one-dot chain lines shown in FIG. 10(C) to give columnar prisms 426 and 428 as shown in FIG. 10(D). In the case where the columnar prisms 426 and 428 are right-angle prisms, these prisms 426 and 428 correspond to the short right-angle prisms 326 and 328 shown in FIG. 2. Side faces 325a and 327a of the columnar prisms 425 and 427 constitute the polished bottom face 404 of the sheet glass 400, whereas side faces 326a and 328a of the columnar prisms 426 and 428 constitute the polished top face 402 of the sheet glass 400. The side faces 325a and 326a of the columnar prisms 425 and 426 and the side faces 327a and 328a of the columnar prisms 427 and 428 are respectively joined together to form the two pairs of prisms.

The four columnar prisms 425, 426, 427, and 428 prepared in the above manner are assembled according to the manufacturing method shown in FIGS. 3(A) through 7. This gives a prism assembly 420, which corresponds to the prism assembly 320 shown in FIG. 2. The prism assembly 420 thus obtained is cut by a desired length in the longitudinal direction, that is, in the direction of the height, to a small prism. The process then polishes the outer face of the small prism evenly to provide the cross dichroic prism 260 shown in FIGS. 1(A) and 1(B) or the cross dichroic prism 260A shown in FIGS. 9(A) and 9(B). The outer face of the cross dichroic prism 260A may be polished to a plane or a curved surface.

The second manufacturing method prepares a cross dichroic prism from a block of sheet glass, thereby enables the resulting cross dichroic prism to have a uniform refractive index. The uniform refractive index effectively prevents a difference between the optical paths of the light components due to refraction of light in the cross dichroic prism. This method forms the required faces in each manufacturing step. This reduces the streaks and flaws on the glass surface, which may occur in the manufacturing process, and enhances the degree of flatness of the reflecting face.

The second manufacturing method discussed above cuts a small prism out of the prism assembly 420 and then polishes the outer face of the small prism. The method is, however, not restricted to this arrangement. The outer face of the prism assembly 420 may be polished before a small prism is cut out of the prism assembly 420.

The second manufacturing method discussed above forms the blue-reflecting film 266B on the sheet glass 400 and then divides the sheet glass 400 into four pieces. One modified arrangement divides the sheet glass 400 into four pieces before forming blue-reflecting films 266B on the side faces of the columnar prisms 426 and 428.

Although the combination of the columnar prisms 425 and 426 and the combination of the columnar prisms 427 and 428 respectively constitute the two pairs of prisms, other combinations may be used in the second manufacturing method. For example, the columnar prism 425 may be combined with the columnar prism 428, whereas the columnar prism 426 may be combined with the columnar prism 427. In another example, the columnar prisms 425 and 427 constitute one pair of prisms, whereas the columnar prisms 426 and 428 constitute the other pair of prisms. The preferable combination is selected to enable the adjoining columnar prisms to have similar refractive indexes. This arrangement effectively prevents deterioration of the picture quality due to refraction of light in the prism.

The first manufacturing method discussed previously may use four columnar prisms that are obtained from one block of sheet glass. Like the second manufacturing method, this arrangement effectively prevents deterioration of the picture quality due to refraction of light in the prism.

In the first manufacturing method, the outer face of the prism assembly 320 or the outer face of the small prism cut out of the prism assembly may be polished to a curved surface, instead of the plane. In this case, the resulting cross dichroic prism consists of four columnar, non-right-angle prisms.

E. Structure of Projection Display Apparatus

Figure 11:
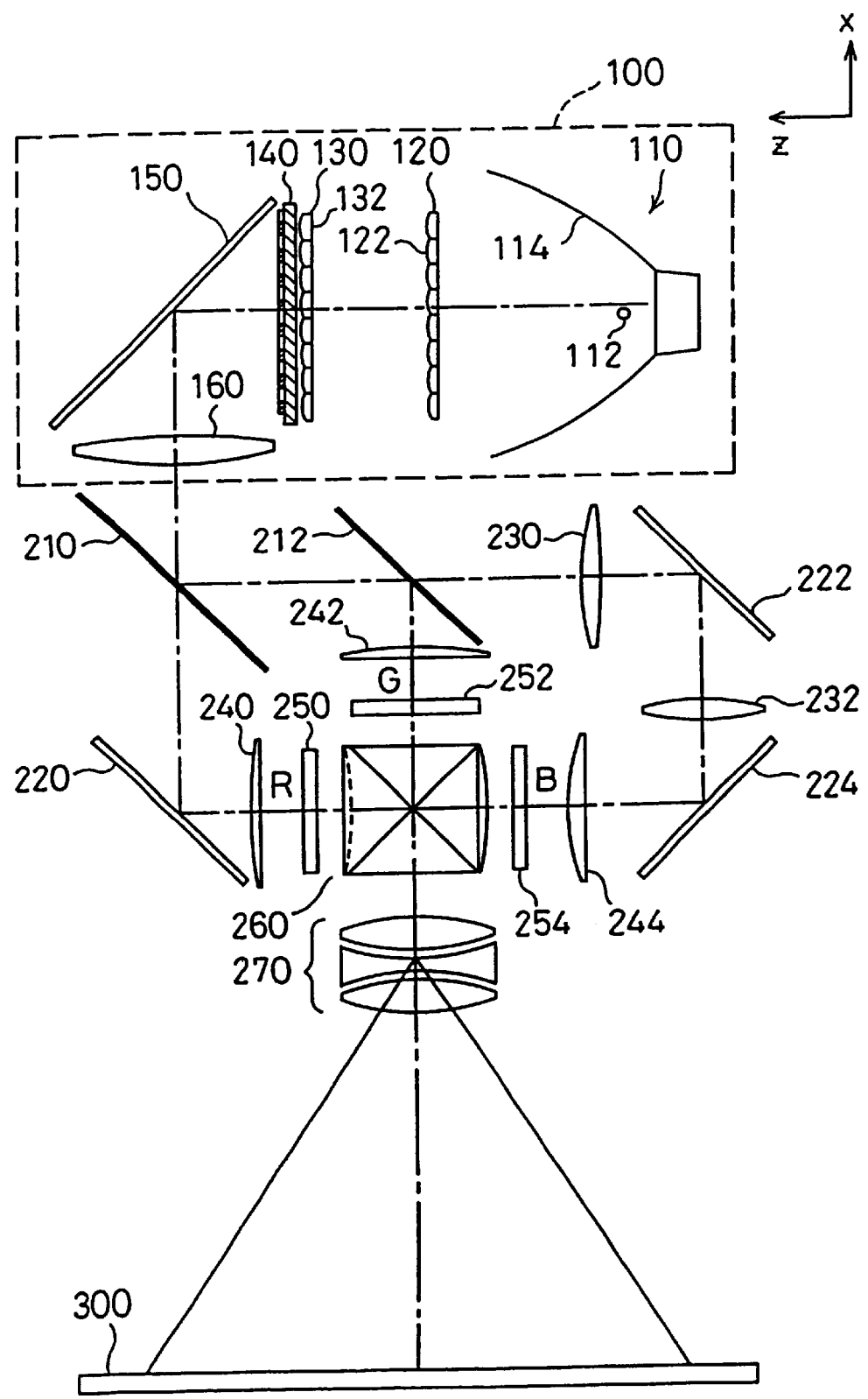
FIG. 11 is a plan view schematically illustrating an essential part of a projection display apparatus with the cross dichroic prism 260 of the embodiment according to the present invention.
Figure 12:
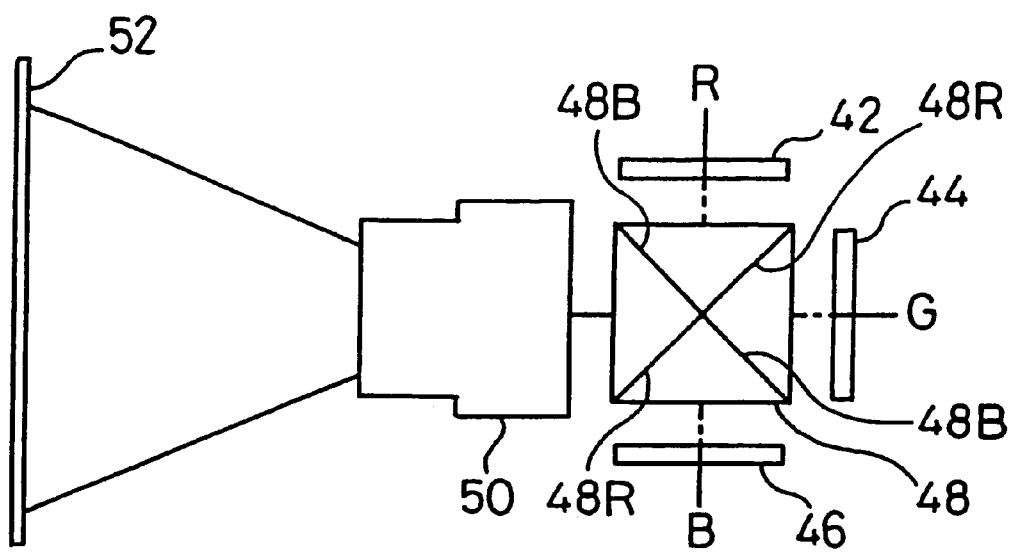
FIG. 12 schematically illustrates an essential part of a conventional projection display apparatus.

FIG. 11 is a plan view schematically illustrating an essential part of a projection display apparatus with the cross dichroic prism 260 of the embodiment according to the present invention. The projection display apparatus includes an illumination system 100, dichroic mirrors 210 and 212, reflecting mirrors 220, 222, and 224, an entrance lens 230, a relay lens 232, three field lenses 240, 242, and 244, three liquid crystal light valves or liquid crystal panels 250, 252, and 254, the cross dichroic prism 260, and a projection lens system 270.

The illumination system 100 has a light source 110 that emits a flux of substantially parallel rays, a first lens array 120, a second lens array 130, a polarizing element 140, a reflecting mirror 150, and a superposing lens 160. The illumination system 100 is an integrator optical system that substantially uniformly illuminates each of the three liquid crystal light valves 250, 252, and 254, which are target areas of illumination.

The light source 110 has a light source lamp 112L, which is a radiant light source that emits rays of light radiantly, and a concave mirror 114, which converts the radiant rays of light emitted from the light source lamp 112 to a flux of substantially parallel rays. A metal halide lamp, a high-pressure mercury lamp, or another high-pressure electric-discharge lamp may be used for the light source lamp 112. A parabolic reflector is preferably used as the concave mirror 114. An ellipsoidal reflector or a spherical reflector may otherwise be used, instead of the parabolic reflector.

The first lens array 120 includes a plurality of first small lenses 122. The second lens array 130 includes a plurality of second small lenses 132, which respectively correspond to the plurality of first small lenses 122. The first lens array 120 and the second lens array 130 divide the flux of substantially parallel rays emitted from the light source 110 into a plurality of partial light fluxes, which subsequently enter the polarizing element 140. The polarizing element 140 has the function of converting the non-polarized light into light of predetermined linear polarization, for example, s-polarized light or p-polarized light, and emitting the linearly polarized light. The plurality of partial light fluxes that enter the polarizing element 140 are respectively converted into predetermined linearly polarized light beams. The partial light fluxes emitted from the polarizing element 140 are reflected by the reflecting mirror 150 and enter the superposing lens 160. The superposing lens 160 causes the plurality of partial light fluxes entering the superposing lens 160 to be superposed on the liquid crystal light valves 250, 252, and 254, which are the target areas of illumination. This enables the respective liquid crystal light valves 250, 252, and 254 to be illuminated in a substantially uniform manner.

The two dichroic mirrors 210 and 212 have the function of a color separator that divides the light flux emitted from the illumination system 100 into three colored light components, red (R), green (G), and blue (B). The first dichroic mirror 210 transmits the red light component, which is included in the light flux emitted from the illumination system 100, while reflecting the blue light component and the green light component.

The red light component transmitted through the first dichroic mirror 210 is reflected by the reflecting mirror 220 and passes through the field lens 240 to reach the liquid crystal light valve 250 for the red light. The field lens 240 has the function of condensing the partial light fluxes that pass through the field lens 240 to light fluxes parallel to the main light beam or the central axis of the light fluxes. The other field lenses 242 and 244 disposed before the other liquid crystal light valves 252 and 254 have the similar function.

The blue light component and the green light component are reflected by the first dichroic mirror 210. The green light component is then reflected by the second dichroic mirror 212 and passes through the field lens 242 to reach the liquid crystal light valve 252 for the green light. The blue light component is, on the other hand, transmitted through the second dichroic mirror 212 and passes through a relay lens system, which includes the entrance lens 230, the relay lens 232, and the reflecting mirrors 222 and 224. The blue light component passing through the relay lens system then passes through the field lens 244 to reach the liquid crystal light valve 254 for the blue light.

The relay lens system is used for the blue light component, in order to prevent a decrease in utilization efficiency of light, which is due to the fact that the blue light component has a longer optical path than those of the other colored light components. The relay lens system enables the blue light component entering the entrance lens 230 to be transmitted to the exit lens or the field lens 244.

The three liquid crystal light valves 250, 252, and 254 have the function of a light modulator that modulates each colored light component according to given image information or image signals and emits the modulated light component representing an image. Polarizing plates are generally disposed on the light-entering surfaces of the liquid crystal light valves 250, 252, and 254. The polarizing direction of the linearly polarized light emitted from the illumination system 100 is accordingly set to be substantially parallel to the transmission axis of each polarizing plate. This arrangement ensures the efficient use of the illumination light emitted from the illumination system 100. The cross dichroic prism 260 has the function of a color combiner or the light-selective prism that combines the three colored light components emitted from the three liquid crystal light valves 250, 252, and 254. In the cross dichroic prism 260, a dielectric multi-layered film that reflects the red light and a dielectric multi-layered film that reflects the blue light are formed in a substantially X shape on the interfaces of the four columnar prisms. The function of these dielectric multi-layered films combines the three colored light components and generates a composite light beam to project a color image. The composite light beam generated by the cross dichroic prism 260 is emitted in the direction of the projection lens system 270. The projection lens system 270 has the function of the projection optical system that projects the composite light beam on a projection screen 300 and thereby displays a color image.

This projection display apparatus utilizes the cross dichroic prism 260 of the embodiment discussed above. This relieves the problem that the steaks are observed on the substantial center of the projected image as well as the problem that the left-side image and the right-side image have different sizes on the display. The cross dichroic prism 260 is a small prism cut out of either the prism assembly 320 or the prism assembly 420, so that the size of the whole projection display apparatus can be reduced.

Figure 9:
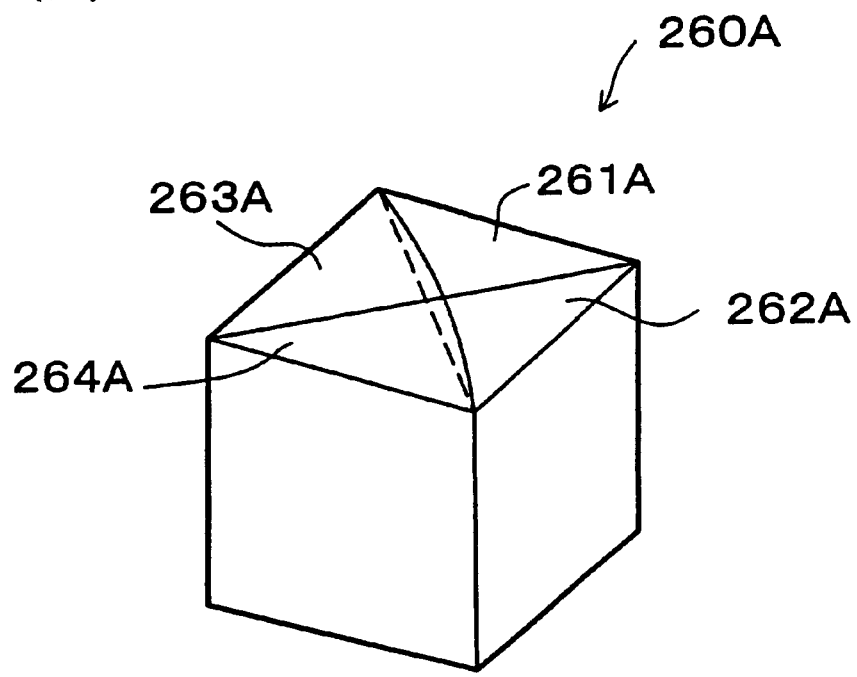
FIGS. 9(A) and 9(B) illustrate another cross dichroic prism 260A as a second embodiment of the light-selective prism according to the present invention.
Figure 9:
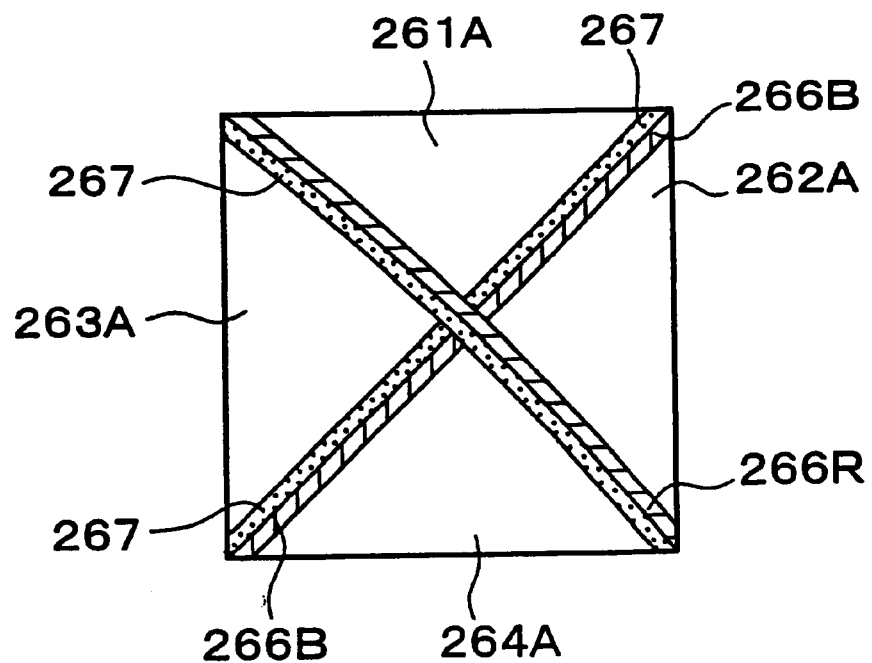

The cross dichroic prism 260A of the second embodiment shown in FIG. 9 may be used in place of the cross dichroic prism 260. This arrangement further prevents deterioration of the picture quality due to chromatic aberration occurring in the projection lens system 270.

The dichroic films in the cross dichroic prism may have a variety of arrangements and structures other than those discussed in the above embodiments. For example, the positions of the red-reflecting film and the blue-reflecting film may be exchanged. In another example, a green-reflecting film may be formed in place of the blue-reflecting film. The colored light components reflected by the dichroic films are not restricted to the combination of red, green, and blue. Any desired combination of films that reflect different colored light components may be specified by taking into account the properties of the films.

In the first embodiment discussed above, the first dichroic film (the blue-reflecting film in the embodiment) is formed on the right-angle face of the short right-angle prism, which joins with the right-angle face of the long right-angle prism to form a pair of prisms. The first dichroic film may, however, be formed on the right-angle face of the long right-angle prism. The manufacturing method of the embodiment may be applied for columnar, non-right-angle prisms. In the case where the four columnar, non-right-angle prisms are glued together to form a light-selective prism, it is preferable that the cross section of the respective columnar prisms has a triangular shape in order to enable the columnar prisms to be bonded together via the closely joined side faces.

In the first embodiment discussed above, the four right-angle prisms that constitute a prism assembly include two long right-angle prisms having an identical length in the longitudinal direction and two short right-angle prisms having an identical length in the longitudinal direction. The identical lengths are, however, not essential. The only requirement here is that the lengths of the short right-angle prisms are less than those of the long right-angle prisms. More concretely, the lengths of the two short right-angle prisms in the longitudinal direction are to be less than the width W3 of the slot 522*c* of the second assembling jig 520 when the two short right-angle prisms are glued to each other and received in the slot 522*c* of the second assembling jig 520 (see FIG. 7). It is desirable that the long right-angle prisms have the lengths that enable the long right-angle prisms to be pressed against the upper surface of the reference face element 522*a*. This arrangement enables the first dichroic films (the blue-reflecting films in the embodiment) respectively formed on the two pairs of prisms to be located on the same plane with high accuracy.

The above embodiment refers to the case in which the present invention is applied to the transmission-type projection display apparatus. The principle of the present invention is, however, also applicable to the reflection-type projection display apparatus. Here the 'transmission-type' means that the light modulator, such as the liquid crystal light valves, transmit light, whereas the 'reflection-type' means that the light modulator reflect light. In the reflection-type projection display apparatus, the cross dichroic prism is used not only as a color separator that divides the incident light into three colored light components, red, green, and blue, but as a color combiner that combines the modulated three colored light components together to emit a composite light beam in a specified direction. Application of the present invention to the reflection-type projection display apparatus exerts similar effects to those of the transmission-type projection display apparatus.

In the above embodiment, the cross dichroic prism is used as the light-selective prism. The principle of the present invention is, however, applicable to a variety of light-selective prisms other than the cross dichroic prism. By way of example, the present invention is applicable to the light-selective prism that includes polarization separating films having the selectivity of polarization as the two light-selective films. The present invention is also applicable to the light-selective film that includes two different types of light-selective films having different optical selectivities with respect to both the colored light components and polarization.

In the above embodiment, the liquid crystal light valves (the liquid crystal panels) are used as the light modulator in the projection display apparatus. Other elements may, however, be used for the light modulator. For example, Digital Micro-Mirror Devices (trade mark by TI Corp.) may be applied for the light modulator. A variety of elements that modulate the incident light to a light beam representing an image according to image signals can be used as the light modulator.

It should be clearly understood that the above embodiments are only illustrative and not restrictive in any sense. The scope and spirit of the present invention are limited only by the terms of the appended claims.

What is claimed is:

1. A projector that projects and displays an image, the projector comprising:

an illumination system that emits illumination light;

a color separator that divides the illumination light into three colored light components;

three light modulators that respectively modulate the respective three colored light components based on given image signals;

a cross dichroic prism that combines the three colored light components modulated by the three light modulators into a composite light beam; and a projection optical system that projects the composite light beam combined by the cross dichroic prism, the cross dichroic prism comprising, four columnar prisms that are joined together on respective side faces thereof, and two dichroic films that are formed along the side faces of the four columnar prisms to cross in a substantially X-shape, wherein one of the two films is continously formed on a curved surface without any separation at an intersection of the two dichroic films.

* * * * *